Patented July 1, 1941

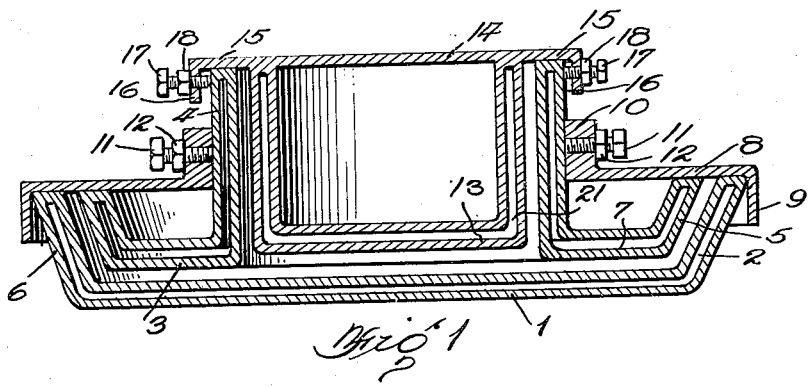
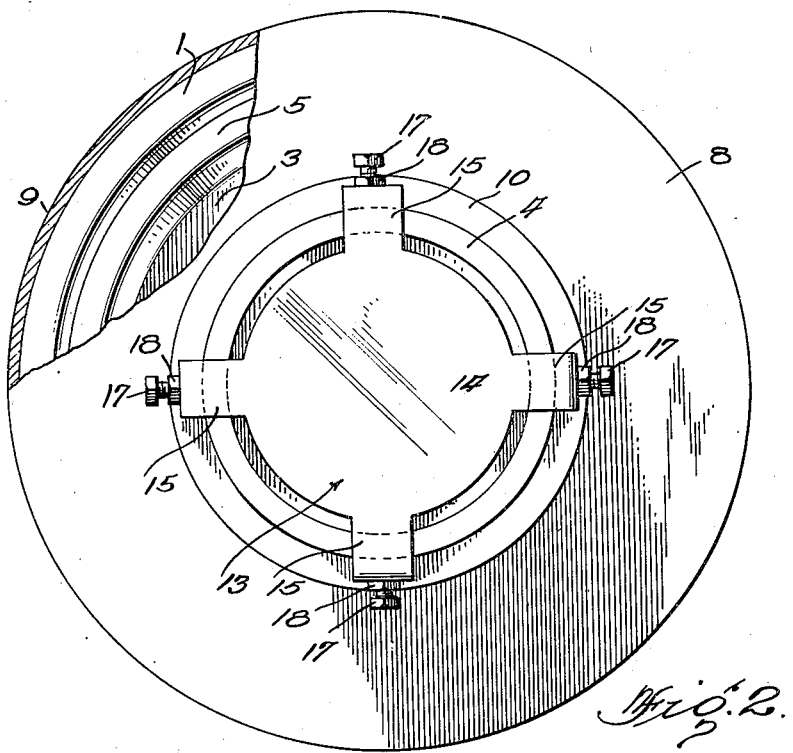
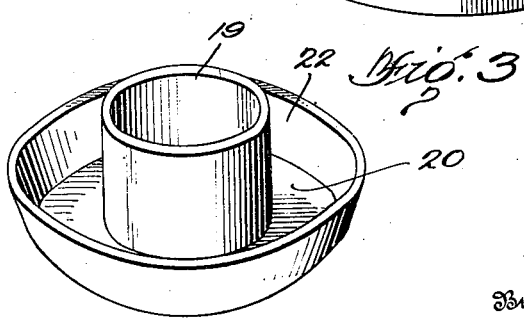

2,247,536

UNITED STATES PATENT OFFICE 2,247,536

APPARATUS FOR FORMING SEAMLESS MILK CAN COVERS

Calvin C. Warren, Rochester, N. Y., assignor of one-fourth to Ronald G. Saunders and one-half to J. Arthur Jennings, both of Irondequoit, N. Y.

Application June 6, 1940, Serial No. 339,185

4 Claims. (Cl. 22—113)

This invention relates to an apparatus for forming seamless milk can covers and it is one object of the invention to provide an apparatus consisting of a mold so formed that the elements constituting the same may be easily assembled and adjusted whereby a cover, formed in the mold will be of the proper thickness.

The present invention relates to certain improvements in the can cover molding apparatus disclosed in my prior Patent No. 2,148,223, dated February 21, 1939.

Another object of the invention is to so form the elements of the mold that after a cover has been formed therein, the mold may be easily taken apart and the cover removed.

Another object of the invention is to provide a mold wherein all of the elements forming the same are of sturdy construction and water-jacketed so that molten metal poured into the mold will be properly cooled and a cover formed which is free from cracks or other blemishes.

In order to illustrate the present invention as applied to a specific article, the present invention will be more specifically described in connection with a milk can cover, having enlarged top portion and a restricted body portion.

In the construction of milk can covers of the type referred to above, the usual practice has been to form the can cover of a plurality of parts which are welded or riveted to form the finished cover. The presence of joints of any form in a milk can cover is highly objectionable in that the joints may be easily ruptured and furthermore provide a gathering place for dirt and other foreign matter. With my improved method of casting, it is possible to provide a seamless can cover which is of maximum strength and has an internal surface free of crevices.

Another object of the invention is to provide a seamless milk can cover having a structure affording maximum strength with a minimum of material and having an internal surface free of crevices which would prevent thorough cleaning thereof or assist in the adherence of dirt or other foreign matter.

A further object of the invention is to provide a cover of the type referred to which may be manufactured in a simple and economical manner.

Other objects and advantages of the invention will appear as the description of the drawing proceeds. I desire to have it understood, however, that I do not intend to limit myself to the particular details shown or described, but that I intend to include as part of my invention all such obvious changes and modifications as would occur to persons skilled in this art.

The invention is illustrated in the accompanying drawing wherein—

Figure 1 is a sectional view taken vertically through the mold;

Figure 2 is a top plan view of the mold with a portion thereof broken away, and

Figure 3 is a perspective view of a finished seamless milk can cover formed by the mold.

This mold has an outer section or pan 1 which is hollow, as shown at 2 in Figure 1, in order that water may be circulated through the walls and bottom of the pan to cool the same. An inner section 3 fits within the outer section and is formed with an upstanding sleeve or neck 4 and a flaring marginal wall 5 spaced inwardly from the wall 6 of the outer section when the inner section is fitted within the outer section. This inner section is also hollow, as shown at 7, for the circulation of cooling water through the same.

A supporting disc or annular cover plate 8 rests upon the upper edge of the annular wall 6 of the outer receiving section or pan 1 and is formed with a depending annular flange 9 about its periphery, which serves to hold the cover plate centered upon the pan. About its inner peripheral edge, the cover plate carries an upstanding collar 10 which is relatively thick and is formed with radial threaded openings through which pass set screws 11 carrying lock nuts 12 and, when tightened, serve to grip the neck 4 of the inner section 3 and hold the inner section 3 spaced upwardly from the pan, with the upper edge of its wall 5 bearing against the under face of the cover plate 8.

A cup-shaped core 13 closed at its top by a head or wall 14 fits into the neck 4 in spaced relation thereto and is formed with radially extending arms 15 terminating in down-turned fingers 16. These fingers carry the set screws 17 provided with lock nuts 18. The arms 15 rest upon the upper edge face of the neck 4 and when the set screws 17 are tightened, they grip the neck and firmly hold the core in concentric relation to the neck. The core will thus be spaced an equal distance from all portions of the neck 4 and all portions of the neck 19 of the milk can cover 20 will be of the same thickness.

The bottom and the walls of the core are hollow to form a water space 21 through which water is circulated to cool the core during a molding operation, and from an inspection of Figure 1 it will be seen that when molten metal is poured into the mold through the space exposed between the arms 15, the same will be confined between the water cooled mold members and when properly cooled or chilled as it hardens, a cover such as shown in Figure 3 will be formed. The lower end of the core is spaced upwardly from the lower end of the neck 4 so that the central portion of the head of the cover surrounded by the neck will be of increased thickness.

By forming the pan 1 and the inner mold section 3 with the marginal walls or flanges, the cover that is cast in the mold will be formed with the marginal flange 22 customarily provided upon milk can covers. After the metal has cooled and set the set screws are loosened and the mold sections taken apart. The completed cover may then be removed from the pan and will be found to be of a unitary seamless formation.

While I have shown the preferred embodiment of my invention, it is to be understood that various changes in the size, shape and arrangement of parts may be resorted to without departing from the spirit of the invention and the scope of the appended claims.

Having thus described the invention, what I claim is:

1. Apparatus for molding seamless container covers comprising an outer pan-like receiving section having a bottom and upstanding marginal walls, an annular inner section fitting into the outer section and having an upstanding annular wall surrounded by the wall of the outer section and an annular sleeve extending upwardly about its inner periphery, an annular disc resting upon the upper edge of the wall of the outer section, an upstanding collar about the inner periphery of said disc fitting snugly about said sleeve, means carried by said collar for engaging the sleeve and supporting the inner section in spaced relation to the outer section with the upper edge of its wall in contact with the under face of the disc, and a core removably mounted in said sleeve in spaced relation to the sleeve and the bottom of the outer section.

2. Apparatus for molding seamless container covers comprising an outer pan-like receiving section having a bottom and upstanding marginal walls, an annular inner section fitting into the outer section and having an upstanding annular wall surrounded by the wall of the outer section and an annular sleeve extending upwardly about its inner periphery, an annular disc resting upon the upper edge of the wall of the outer section and having a depending flange about its outer periphery fitting about the wall of the outer section to maintain the disc in position upon the outer section, means carried by said disc for engaging said sleeve and suspending the inner section in spaced relation to the outer section with the upper edge of the wall of the inner section in contact with the under face of the disc, and a core removably supported in said sleeve in spaced relation to the sleeve and the bottom of the outer section.

3. Apparatus for molding seamless container covers comprising an outer pan-like receiving section having a bottom and upstanding marginal walls, an annular inner section fitting into the outer section and having an upstanding annular wall surrounded by the wall of the outer section and an annular sleeve extending upwardly about its inner periphery, an annular disc resting upon the upper edge of the wall of the outer section, means carried by said disc at the inner periphery thereof for engaging said sleeve and supporting the inner section in spaced relation to the outer section with the upper edge of the wall of the inner section in contact with the under face of the disc, a core fitting within said sleeve, arms extending from the upper end of said core and resting upon the upper end of the sleeve to support the core in spaced relation to the sleeve and the bottom of the outer section, and means carried by the arm for adjustably securing the core and retaining the core in spaced relation to walls of the sleeve.

4. Apparatus for molding seamless container covers comprising an outer pan-like receiving section having a bottom and upstanding marginal walls, an annular inner section fitting into the outer section and having an upstanding annular wall surrounded by the wall of the outer section and an annular sleeve extending upwardly about its inner periphery, an annular disc resting upon the upper edge of the wall of the outer section, an upstanding collar about the inner periphery of said disc, set screws carried by said collar for engaging said sleeve and supporting the inner section in spaced relation to the outer section with the upper edge of the wall of the inner section in contact with the under face of the disc, a core of appreciably less diameter than the sleeve fitting within the sleeve, said core being hollow and having side walls and a top and a bottom, arms extending radially from the top of said core in spaced relation to each other circumferentially thereof and resting upon the upper edge of the sleeve to removably support the core in the sleeve in spaced relation to the bottom of the outer section, tongues extending downwardly from outer ends of said arms, and set screws carried by said tongues for engaging the sleeve and holding the arms in place upon the sleeve with the core in concentric spaced relation to the sleeve.

CALVIN C. WARREN.